United States Patent
Nakai et al.

(10) Patent No.: US 8,625,054 B2
(45) Date of Patent: Jan. 7, 2014

(54) DISPLAY DEVICE INCLUDING LIGHT GUIDE AND LIGHT EXTRACTION UNIT WITH LIQUID CRYSTAL

(75) Inventors: Yutaka Nakai, Kanagawa-ken (JP); Tsuyoshi Hioki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 176 days.

(21) Appl. No.: 13/239,794

(22) Filed: Sep. 22, 2011

(65) Prior Publication Data

US 2012/0188499 A1    Jul. 26, 2012

(30) Foreign Application Priority Data

Jan. 26, 2011  (JP) .................................. 2011-014600

(51) Int. Cl.
*G02F 1/1333* (2006.01)
*G02F 1/1343* (2006.01)

(52) U.S. Cl.
USPC ................ 349/86; 349/139; 349/88; 349/89; 349/90

(58) Field of Classification Search
USPC ................... 349/86, 88, 89, 90, 139; 385/901
See application file for complete search history.

(56) References Cited

U.S. PATENT DOCUMENTS

| | | | |
|---|---|---|---|
| 6,271,899 B1 * | 8/2001 | Lewis et al. | 349/86 |
| 6,429,914 B1 * | 8/2002 | Kubota et al. | 349/86 |
| 2004/0095524 A1 * | 5/2004 | Date et al. | 349/89 |

FOREIGN PATENT DOCUMENTS

| | | | | |
|---|---|---|---|---|
| JP | 2000111863 A | * | 4/2000 | ............... G02F 1/13 |
| JP | 2005-221590 | | 8/2005 | |
| JP | 2005221590 A | * | 8/2005 | ............... G02F 1/13 |

OTHER PUBLICATIONS

U.S. Appl. No. 12/979,902, filed Dec. 28, 2010, Nakai et al.

* cited by examiner

*Primary Examiner* — Mike Qi
(74) *Attorney, Agent, or Firm* — Oblon, Spivak, McClelland, Maier & Neustadt, L.L.P.

(57) ABSTRACT

According to one embodiment, a display device includes a light source, a light guide, a light extraction unit, and a drive circuit. The light guide is configured to guide light emitted by the light source from one end side of the light guide toward one other end side of the light guide. The light extraction unit is provided on a surface of the light guide, and includes a liquid crystal dispersion layer, a first electrode, and a second electrode. The liquid crystal dispersion layer includes liquid crystal droplets, and the first and second electrodes are configured to cause an electric field to occur in the liquid crystal dispersion layer. The drive circuit is configured to apply a voltage between the electrodes. Liquid crystal molecules included in the liquid crystal droplets are configured to have an orientation parallel to the surface of the light guide in the electric field.

12 Claims, 8 Drawing Sheets

FIG. 8

DISPLAY DEVICE INCLUDING LIGHT GUIDE AND LIGHT EXTRACTION UNIT WITH LIQUID CRYSTAL

CROSS-REFERENCE TO RELATED APPLICATIONS

This application is based upon and claims the benefit of priority from the prior Japanese Patent Application No. 2011-014600, filed on Jan. 26, 2011; the entire contents of which are incorporated herein by reference.

FIELD

Embodiments described herein relate generally to a display device.

BACKGROUND

In recent years, display devices that use light guide structures have been proposed. Such a display device includes, for example, multiple light sources in one column, multiple light guides connected respectively to the light sources, and light extraction units multiply provided on each of the light guide surfaces. An image can be displayed in the display device by physically or chemically changing the light extraction units to control an extraction and a non-extraction of light from the light guide surface by the light extraction units.

However, it is desirable to increase the light extraction efficiency in such a display device.

DETAILED DESCRIPTION

According to one embodiment, a display device includes a light source, a light guide, a light extraction unit, and a drive circuit. The light guide is configured to guide light emitted by the light source from one end side of the light guide opposing the light source toward one other end side of the light guide. The light extraction unit is provided on a surface of the light guide. The light extraction unit includes a liquid crystal dispersion layer, a first electrode, and a second electrode. The liquid crystal dispersion layer includes liquid crystal droplets having an average diameter of not more than 100 nm, and the first electrode and the second electrode are configured to cause an electric field to occur in the liquid crystal dispersion layer. The drive circuit is configured to apply a voltage between the first electrode and the second electrode. Liquid crystal molecules included in the liquid crystal droplets are configured to have an orientation parallel to the surface of the light guide in the electric field.

Various embodiments will be described hereinafter with reference to the accompanying drawings.

The drawings are schematic or conceptual; and the relationships between the thicknesses and the widths of portions, the proportions of sizes among portions, etc., are not necessarily the same as the actual values thereof. Further, the dimensions and the proportions may be illustrated differently among the drawings, even for identical portions.

In the specification and the drawings of the application, components similar to those described in regard to a drawing thereinabove are marked with like reference numerals, and a detailed description is omitted as appropriate.

First Embodiment

A display device which is a first embodiment will now be described using FIG. 1 and FIG. 2.

Figure 1:
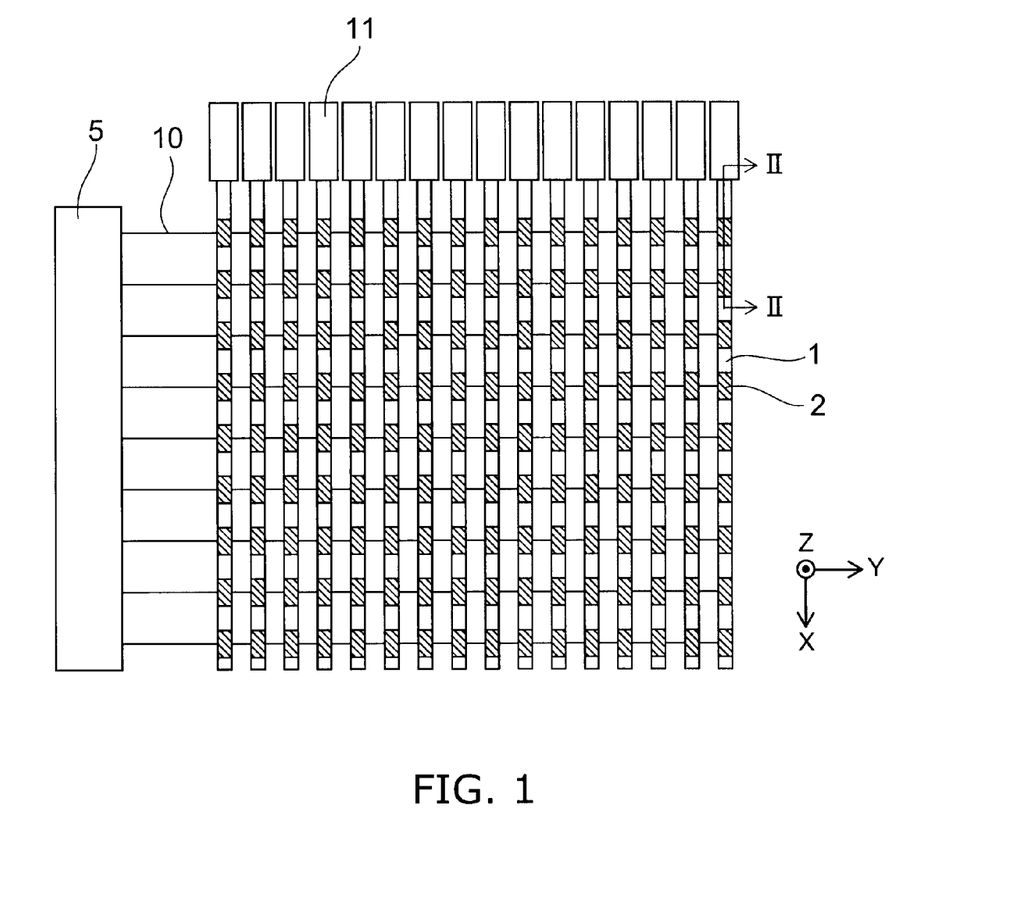
FIG. 1 is a plan view of a display device according to a first embodiment.

As illustrated in FIG. 1, the display device includes: multiple light sources 11 arranged in a Y direction; multiple light guides 1 having columnar configurations extending in an X direction substantially orthogonal to the Y direction, the multiple light guides 1 being mutually separated by a spacing dy and substantially parallel to each other; and multiple light extraction units 2 provided on a surface of each of the light guides 1 with a pixel spacing dx which is constant. A direction perpendicular to the X direction and the Y direction is taken as a Z direction.

It is favorable for the light source 11 to be capable of changing the intensity or the color of the light emitted according to the pixel data to be displayed. Each of the light guides 1 has one end and one other end; and the one end is connected to the light source 11. The light guide 1 guides the light emitted by the light source 11 toward the X direction from the one end side toward the one other end side while causing the light to undergo total internal reflections. This light will be called incident light. The light that reaches the one other end of the light guide 1 is reflected and guided from the one other end side toward the one end side. This light will be called returned light.

The display device further includes: a drive circuit 5 to create an electric field by supplying a voltage to the light extraction units 2; and multiple scanning lines 10 connected to the drive circuit 5. The scanning lines 10 are disposed with the spacing dx to be substantially orthogonal to the light guides 1. The scanning lines 10 are connected to the light extraction units 2 at the intersections with the light guides 1. As described below, the light extraction unit 2 is switched to a light-extracting state when the voltage is applied to extract the light inside the light guide 1 to the outside of the light guide 1. In the case where the voltage is not applied, the light is not extracted from the light extraction unit 2.

In the embodiment, each of the light extraction units 2 forms one pixel. Multiple light extraction units 2 may form one pixel.

For example, a display device will be described in which M light sources 11 are arranged in the Y direction, and N light extraction units 2 are provided for each of the light guides 1. Such display devices can display a two-dimensional image having M pixels in the Y direction and N pixels in the X direction. The M light extraction units 2 (the pixels) arranged in the Y direction are taken as one line; and the image can be displayed by controlling the light extraction of the light extraction units 2 included in one line and by scanning by sequentially switching by line units from the first line of the uppermost X-direction portion to the Nth line of the lowermost portion.

When displaying the ith line (i=1 to N), the light sources 11 emit light of the intensities and the colors corresponding to the image data of the ith line by supplying the image data of the ith line to the light sources 11 for, for example, a time Δt. This light propagates through the light guides 1 in the X direction. The electric field is created synchronously with the light emission by supplying the drive signal from the drive circuit 5 to only the ith scanning line 10 for, for example, the time Δt. When the drive signal is provided to the ith scanning line 10, the voltage is applied to the light extraction units 2 of the ith line; and the light extraction units 2 of the ith line are switched to the light-extracting state. Therefore, the light propagating through the light guides 1 is extracted from the ith light extraction units.

After the prescribed amount of time Δt, the light corresponding to the (i+1)th image data is extracted from the (i+1)th light extraction units 2 by supplying the image data of the (i+1)th line to the light sources 11 and by the drive circuit 5 selecting the (i+1)th scanning line 10 and supplying the drive signal.

The configuration in which the light inside the light guide 1 is extracted by applying the voltage to the light extraction unit 2 will now be described. FIG. 2 is an enlarged view illustrating the cross section along line II-II along the extension direction of the light guide 1 of the display device illustrated in FIG. 1.

Figure 2:
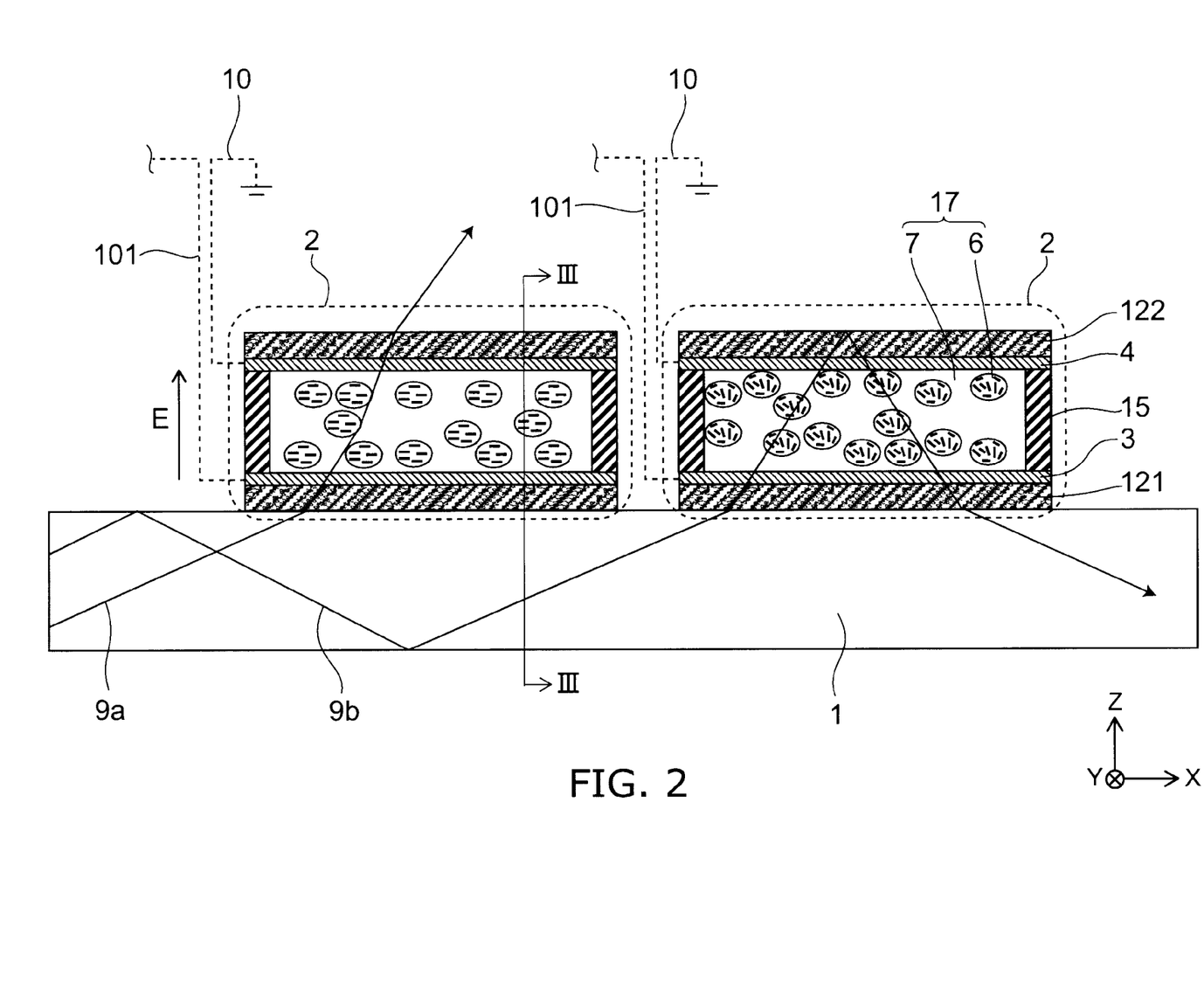
FIG. 2 is a partially enlarged cross-sectional view of the display device according to the first embodiment.

As illustrated in FIG. 2, the light extraction unit 2 includes: a first transparent substrate 121 provided parallel to the surface of the light guide 1; a first electrode 3 provided on the first transparent substrate 121; a liquid crystal dispersion layer 17 provided on the first electrode 3; a second electrode 4 provided on the liquid crystal dispersion layer 17; a second transparent substrate 122 provided on the second electrode 4; and a sealing member 15 provided between the first electrode 3 and the second electrode 4 around the liquid crystal dispersion layer 17.

The liquid crystal dispersion layer 17 includes a transparent member 7, which is optically transmissive, and liquid crystal droplets 6, which have an average diameter of not more than 100 nm and are dispersed in the transparent member 7. The liquid crystal droplets 6 are formed of a material including liquid crystal molecules. In other words, a so-called polymer dispersed liquid crystal (PDLC) is employed in which the liquid crystal droplets 6 which have granular configurations are dispersed in the transparent member 7.

A material that cures due to heat or ultraviolet, e.g., a resin such as an ultraviolet-curing resin, etc., may be used as the transparent member 7. The ultraviolet-curing resin in the uncured state is mixed with the material of the liquid crystal droplets 6; and the liquid crystal droplets 6 are dispersed in the transparent member 7. Subsequently, the transparent member 7 is cured.

Liquid crystal molecules having orientations that align in an electric field, e.g., a nematic liquid crystal, may be used as the material of the liquid crystal droplets 6. A chiral material may be added to further assist the orientation of the liquid crystal. In the embodiment, liquid crystal molecules having a negative dielectric anisotropy are used as the liquid crystal droplets 6. These liquid crystal molecules align in a direction perpendicular to the electric field direction. The mixing ratio of the material of the liquid crystal droplets 6 and the material of the transparent member 7 is determined by the material of the liquid crystal droplets 6 and the material of the transparent member 7 and is within a range in which the liquid crystal droplets 6 are easily formed with an average diameter of not more than 100 nm.

In the case where an ultraviolet-curing resin is used as the transparent member 7, the transparent member 7 is cured in the manufacturing by irradiating ultraviolet rays. Accordingly, the boundaries between the transparent member 7 and the liquid crystal droplets 6 can be seen when viewing the cross section of the liquid crystal dispersion layer 17 with a microscope and the like.

The first electrode 3 and the second electrode 4 are configured to apply an electric field to the liquid crystal dispersion layer 17. It is favorable to use a transparent electrode, e.g., a transparent conductive material such as ITO (indium tin oxide alloy), etc., as the materials of the first electrode 3 and the second electrode 4. A transparent insulating material such as, for example, polyethylene terephthalate (PET), polycarbonate, an acrylic resin, etc., may be used as the first transparent substrate 121 and the second transparent substrate 122. A material such as, for example, an epoxy resin, etc., may be used as the sealing member 15. For example, an acrylic resin, etc., may be used as the light guide 1.

The scanning line 10 is connected to the first electrode 3. Although not illustrated in FIG. 1, a scanning line 101 is connected to the second electrode 4; and the scanning line 101 is grounded. When the voltage from the drive circuit 5 is applied to the first electrode 3 via the scanning line 10, an electric field occurs in the liquid crystal dispersion layer 17 in the Z direction perpendicular to the major surface of the first electrode 3 and the second electrode 4. Accordingly, the liquid crystal molecules included in the liquid crystal droplets 6 inside the electric field have orientations in directions perpendicular to the Z direction and parallel to the XY plane. The liquid crystal molecules included in the liquid crystal droplets are illustrated with rod configurations in the drawings.

The case will now be described where the voltage is not applied to the first electrode 3 and the second electrode 4 as in the light extraction unit 2 of the right side of FIG. 2. In this case, the orientations of the liquid crystal molecules of the liquid crystal droplets 6 are random; and the equivalent refractive index $n_{iso}$ of the liquid crystal droplets 6 is provided by Formula 1.

$$n_{iso} = \frac{n_e + 2n_o}{3} \quad \text{[Formula 1]}$$

Here, ne is the refractive index of the extraordinary rays in the liquid crystal; and no is the refractive index of the ordinary rays in the liquid crystal. The refractive index of the liquid crystal dispersion layer 17 is the average refractive index of the liquid crystal droplets 6 and the transparent member 7. Because the liquid crystal droplets 6 are optically isotropic, the liquid crystal dispersion layer 17 also is optically isotropic. In other words, the refractive index of the liquid crystal dispersion layer 17 in the direction perpendicular to the major surface of the first electrode 3 and the second electrode 4 is equal to the refractive index in oblique directions.

In such a state, when the light that propagates through the light guide 1 while undergoing total internal reflections reaches the portion where the light extraction unit 2 is provided, the light passes through the liquid crystal dispersion layer 17 as illustrated by an arrow 9b and undergoes a total internal reflection at the second transparent substrate 122.

The light that undergoes the total internal reflection again passes through the liquid crystal dispersion layer 17 to return to the light guide 1.

On the other hand, an electric field occurs in the liquid crystal dispersion layer 17 in the case where the voltage is applied to the first electrode 3 and the second electrode 4 as in the light extraction unit 2 of the left side of FIG. 2. In the embodiment, the liquid crystal molecules have orientations in directions parallel to the XY plane when the electric field occurs in the liquid crystal dispersion layer 17 because the liquid crystal molecules that are used have a negative dielectric anisotropy. The refractive index of the liquid crystal droplets 6 in the X direction and the Y direction is no. On the other hand, a refractive index n of the liquid crystal droplets 6 in the Z direction is represented by Formula 2. The refractive index n of Formula 2 is larger than the refractive index no. Thus, a refractive index anisotropy occurs in the liquid crystal dispersion layer 17 because a refractive index anisotropy occurs in the liquid crystal droplets 6.

$$n = \frac{n_e + 2n_o}{2} \quad \text{[Formula 2]}$$

In such a state, when the light propagating through the light guide 1 reaches the portion where the light extraction unit 2 of the light guide 1 is provided, the light passes through the liquid crystal dispersion layer 17 as illustrated by an arrow 9a.

Herein, the light passing through the liquid crystal dispersion layer 17 will be described separately for the component traveling in the Z direction while polarizing parallel to the X direction and the component traveling in the Z direction while polarizing in the Y direction.

As illustrated by the light extraction unit 2 of the left side of FIG. 2, the component traveling in the Z direction while polarizing in the X direction is deflected in the Z direction because of the refractive index anisotropy occurring in the liquid crystal dispersion layer 17. This is because of the property of light being deflected in the direction of the larger refractive index.

Figure 3:
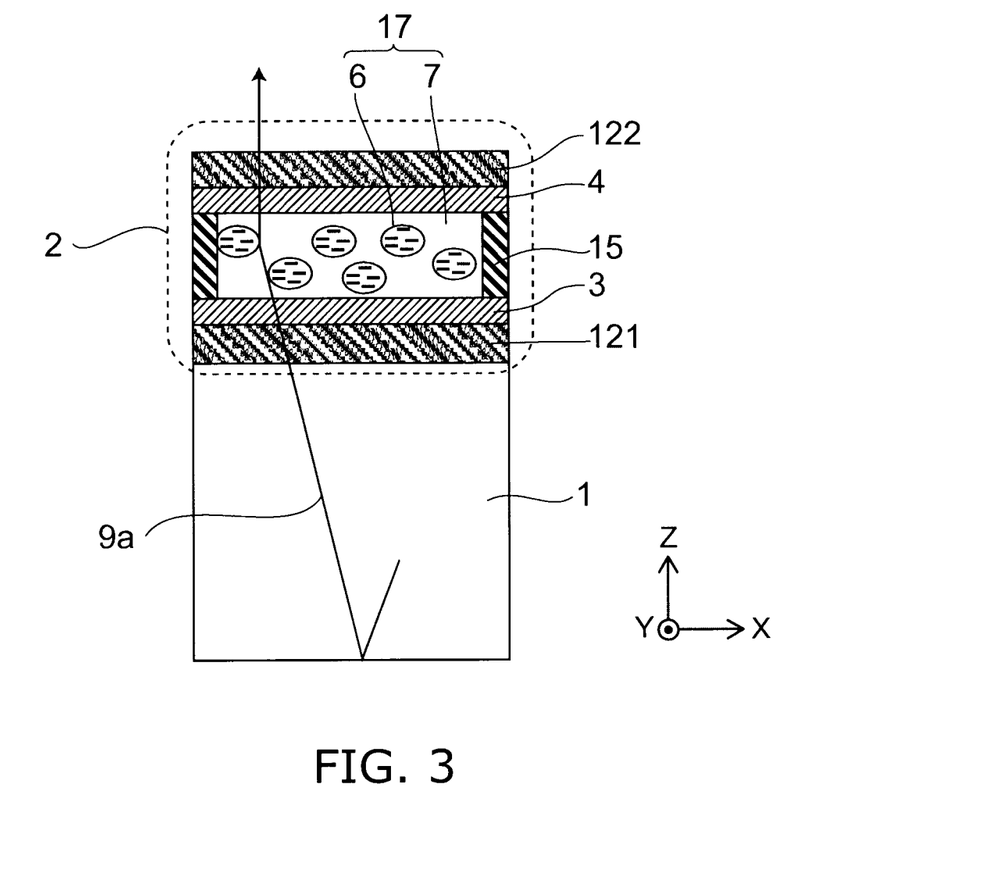
FIG. 3 is an enlarged view illustrating the cross section along line III-III of the display device of FIG. 2.

The component traveling in the Z direction while polarizing in the Y direction will be described using FIG. 3. FIG. 3 is an enlarged view illustrating the III-III cross section of FIG. 2; and the cross-sectional configuration of the light guide 1 is square. This component also deflects in the Z direction inside the liquid crystal dispersion layer 17 as illustrated in FIG. 3. This is because the refractive index of the liquid crystal dispersion layer 17 is larger in the Z direction than in the Y direction.

Thus, the incident angle of the light on the second transparent substrate 122 surface decreases because the light passing through the liquid crystal dispersion layer 17 deflects in the Z direction; and the light for which the incident angle is smaller than the critical angle is emitted to the outside of the light guide 1 without undergoing a total internal reflection.

The light that has a large incident angle with the second transparent substrate 122 and is not emitted to the outside of the light guide 1 again passes through the liquid crystal dispersion layer 17 after undergoing a total internal reflection at the second transparent substrate 122. At this time, the light again deflects in the Z direction. Subsequently, the light that goes back into the light guide 1 deflects further in the Z direction by passing through the liquid crystal dispersion layer 17 when again passing through the light extraction unit 2.

The viewing direction of the display device is the Z direction; and the viewer views the surface where the light extraction unit 2 are arranged. As described above, the incident angle of the light on the second transparent substrate 122 can be reduced and the amount of the light extracted in the Z direction can be increased due to the deflection by the liquid crystal dispersion layer 17. Accordingly, the light extraction efficiency of this display device is high. Light leakage is low because the light is prevented from being extracted in directions other than the Z direction.

Thus, the orientations of the liquid crystal molecules of the liquid crystal dispersion layer 17 can be controlled and the extraction and the non-extraction of the light inside the light guide 1 can be switched by switching between the application and the non-application of the voltage to the first electrode 3 and the second electrode 4.

The response rate of the liquid crystal molecules to the electric field depends on the size of the liquid crystal droplets 6. In the case where the average size of the liquid crystal droplets 6 is not more than 100 nm, the liquid crystal molecules can respond within not more than 100 μsec.

Generally, the wavelength of the light propagating through the light guide 1 is within the range of visible light of about 360 nm to 750 nm. In the case where the liquid crystal droplets 6 are sufficiently smaller than the visible light wavelength, the scattering caused by the difference of the refractive indexes of the liquid crystal droplets 6 and the transparent member 7 substantially can be ignored. The scattering recited above can be reduced and the liquid crystal dispersion layer 17 can be considered to be an optically homogeneous phase by reducing the size of the liquid crystal droplets 6 or by reducing the refractive index difference between the liquid crystal droplets 6 and the transparent member 7. The average diameter of the liquid crystal droplets 6 is, for example, 50 nm. The diameter of the liquid crystal droplets 6 may be, for example, the value of the average of the longest diameter of the liquid crystal drop 6 for each of the liquid crystal droplets 6 of one cross section of the liquid crystal dispersion layer 17.

The sealing member 15 suppresses the degradation of the reliability due to the liquid crystal dispersion layer 17 coming in contact with air; and the sealing member 15 is not essential. By the sealing member 15 being a light-absorbing material, the light leaking out through the sealing member 15 from the liquid crystal dispersion layer 17 in the non light-extracting state can be suppressed; and the image quality of the display device improves.

Although the cross section of the light guide 1 is not particularly specified, the embodiment is practicable also when light guides having various cross-sectional configurations such as quadrilaterals, circles, ellipses, etc., are used.

An example of a specific method for manufacturing the configuration of the light extraction unit 2 of the embodiment will now be described.

First, the method for manufacturing the light extraction unit 2 will be described. The first electrode 3 is provided on one major surface of the first transparent substrate 121; and the second electrode 4 is provided on one major surface of the second transparent substrate 122. The one major surfaces of the first transparent substrate 121 and the second transparent substrate 122 where the first electrode 3 and the second electrode 4 are provided oppose each other. The average distance between the first electrode 3 and the second electrode 4 is, for example, 10 to 50 μm, and as a specific example, is 30 μm. The sealing member 15 is provided in a frame-like configuration between the first electrode 3 and the second electrode 4 while leaving an injection opening.

Then, a mixture of the material of the liquid crystal droplets 6 and the material of the transparent member 7 is caused to enter the gap between the first electrode 3 and the second electrode 4 from the injection opening. An ultraviolet-curing resin is used as the material of the transparent member 7. Then, the ultraviolet-curing resin used to form the transparent member 7 is polymerized by irradiating ultraviolet light onto the mixture recited above. As a result, the material of the transparent member 7 cures in the gap between the first electrode 3 and the second electrode 4; simultaneously, the material of the liquid crystal droplets 6 is formed into the liquid crystal droplets 6 having an average diameter of not more than 100 nm; and the liquid crystal dispersion layer 17 is formed. The thickness of the liquid crystal dispersion layer 17 is equal to the distance between the first electrode 3 and the second electrode 4, that is, for example, with an average in the range of 10 to 50 μm, and in this case, with an average of 30 μm.

Continuing, such light extraction units 2 are provided on the surfaces of the light guides 1. The multiple light guides 1 on which the light extraction units 2 are provided are disposed parallel to each other; and the light sources 11 are disposed at one end of the light guides respectively. The display device is formed by disposing the scanning lines 10 connected to the drive circuit 5 to be orthogonal to the light guides 1. Although a method is described in which the light extraction units 2 are provided on the surfaces of the light guides 1 after being formed, it is also possible to provide the first transparent substrates 121 on the surfaces of the light guides 1 and form the light extraction units 2 directly on the surfaces of the light guides 1.

A specific example will now be described.

MLC-2079 (manufactured by Merck with no=1.49 and ne=1.64) is used as a nematic liquid crystal having a negative dielectric anisotropy; and NOA81 (manufactured by Norland with a refractive index of 1.56) is used as an ultraviolet-curing resin. A liquid crystal:resin mixing ratio of 20:80 is used. Both are mixed well and caused to enter the gap between the pair of transparent substrates having the electrodes provided on the one major surfaces of the pair of transparent substrates. Subsequently, ultraviolet light (300 mW/cm$^2$) is irradiated to cure the resin to obtain a transparent liquid crystal dispersion layer in which micro liquid crystal droplets are dispersed in the resin. The average diameter of the liquid crystal droplets is 50 nm.

The light extraction unit is formed by providing such a liquid crystal dispersion layer between the pair of transparent substrates including the electrodes.

The obtained light extraction unit is brought into contact with an acrylic light guide. Optical coupling liquid having a refractive index of 1.50 is coated onto the contact portion of the light guide such that the light extraction unit and the light guide are optically in contact. It is also possible to completely fix the light extraction unit to the light guide by using an ultraviolet-curing resin instead of the optical coupling liquid and by irradiating light onto the ultraviolet-curing resin.

A light emitting diode is disposed as a light source at one end of the light guide; and light entered the light guide from the light emitting diode. The light is extracted from the light extraction unit by switching the liquid crystal dispersion layer to a deflecting state by applying an alternating current voltage of 200 V between the pair of electrodes. The response rate is about 20 μsec. In the state in which the voltage is not applied to the electrodes, no light leakage is viewable; and there is substantially no optical loss.

Then, multiple light guides having the light sources at the one end are disposed parallel to each other as illustrated in FIG. 1. Multiple scanning lines are disposed parallel to each other to be orthogonal to the multiple light guides. The scanning lines are connected to the drive circuit. The light extraction units are provided at the intersections between the light guide surfaces and the scanning lines. Optical coupling liquid is provided between the light extraction units and the light guides.

Here, a voltage of 200 V is sequentially applied to any of the scanning lines from the drive circuit; and the light-extracting state is set for each line of the light extraction units. Synchronously with the light-extracting state, light having the prescribed intensities/colors is caused to enter the light guides from the multiple light sources; and light is extracted from the light extraction units provided at the scanning line selected by the drive circuit. An image could be displayed as a result of sequentially scanning this operation for all of the lines. The light extraction units have a fast response of about 20 μsec and could sufficiently follow even video images.

Thus, according to the embodiment, a display device having low optical loss and a high light utilization efficiency can be obtained because the light leakage amount from the light extraction units is low when the voltage is not applied to the electrodes.

Second Embodiment

Figure 4A:
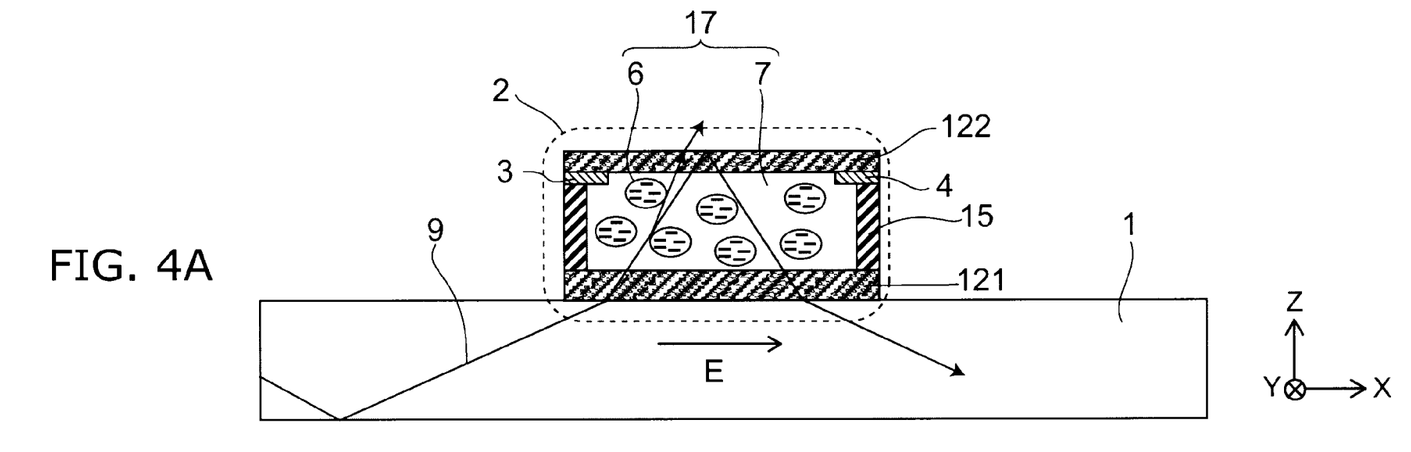
FIGS. 4A and 4B are cross-sectional views of a display device according to a second embodiment.
Figure 4B:
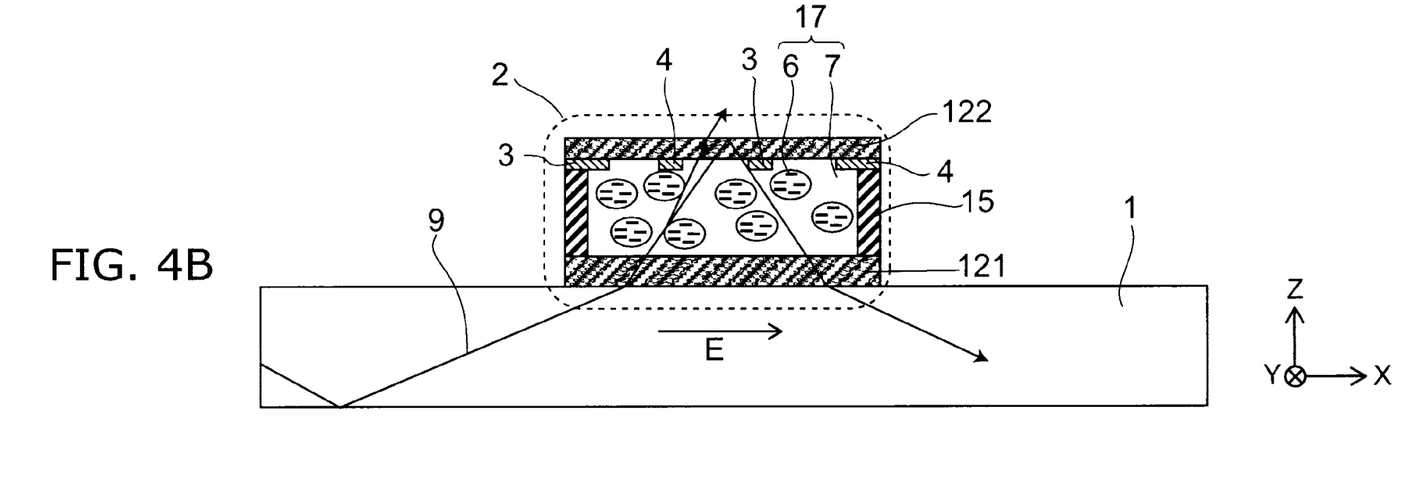

FIGS. 4A and 4B illustrate the cross-sectional structure of one pixel of a display device according to a second embodiment.

The second embodiment differs from the first embodiment in that the first electrode 3 and the second electrode 4 are provided between the second transparent substrate 122 and the liquid crystal dispersion layer 17. It is also different that liquid crystal molecules having a positive dielectric anisotropy are used as the material of the liquid crystal droplets 6. The first electrode 3 and the second electrode 4 apply the voltage to the liquid crystal dispersion layer 17 in a so-called in-plane mode configured to cause an electric field to occur inside a plane parallel to the major surfaces of the first electrode 3 and the second electrode 4. Because the orientation of the electric field is in the X direction, the long axes of the liquid crystal molecules are parallel to the X direction in the light-extracting state.

FIG. 4A and FIG. 4B are enlarged views illustrating the cross section of the light guide 1 and the light extraction unit 2 provided on the light guide 1 and illustrate the case where the voltage is applied to the first electrode 3 and the second electrode 4.

As illustrated in FIG. 4A, the first electrode 3 and the second electrode 4 are disposed on the liquid crystal dispersion layer 17. Because the transmitted amount of the light is large at the center of the second transparent substrate 122, the first electrode 3 and the second electrode 4 are disposed at the outer edge of the light extraction unit 2 so as not to impede the transmission of the light.

Similarly to the first embodiment, in the case where the voltage is not applied to the first electrode 3 and the second electrode 4, the orientations of the liquid crystal molecules included in the liquid crystal droplets 6 are random. On the other hand, the orientations of the liquid crystal molecules included in the liquid crystal droplets 6 align in the X direction when the voltage is applied to the first electrode 3 and the second electrode 4. Accordingly, of the light passing through the liquid crystal dispersion layer 17, a component 9 traveling in the Z direction while polarizing in the X direction can be deflected in the Z direction.

Of the light passing through the liquid crystal dispersion layer 17, the component traveling in the Z direction while polarizing in the Y direction returns to the light guide 1 without being deflected. The component of the incident light polarizing in the Y direction has a portion that oscillates in the X direction when reflected by the one other end of the light guide 1 to become returned light. In the return path, the light that now oscillates in the X direction is deflected when passing through the liquid crystal dispersion layer 17 to be extracted to the outside of the light guide 1.

Thus, the amount of the light extracted to the outside of the light guide 1 in the case where the light is deflected can be higher in the liquid crystal dispersion layer 17 than in the case where the light is not deflected. Moreover, the light leakage can be prevented.

Transparent electrodes typified by ITO absorb light albeit slightly. Because the first electrode 3 and the second electrode 4 are provided at the outer edge of the second transparent substrate 122, the amount of the light passing through the first electrode 3 and the second electrode 4 is low. Accordingly, the optical loss due to the first electrode 3 and the second electrode 4 is low.

The light extraction unit is made similarly to the example illustrated in the first embodiment. The extraction of the light from the light extraction unit could be confirmed for a distance between the first electrode 3 and the second electrode 4 of 40 μm when a voltage of 300 V is applied.

Although an example is illustrated in FIG. 4A in which one first electrode 3 and one second electrode 4 are disposed in one light extraction unit 2, in the case where the light extraction unit 2 is large, the distance between the first electrode 3 and the second electrode 4 increases and there is a risk that the necessary applied voltage may increase. Therefore, as illustrated in FIG. 4B, the first electrode 3 and the second electrode 4 may be multiply disposed in the X direction. The distance between the first electrode 3 and the second electrode 4 can be shorter; and the drive voltage can be reduced.

The first electrode 3 and the second electrode 4 may be disposed in the light extraction unit 2 center, etc., as long as the optical loss does not become large. Effects such as the delay of the drive signal, etc., caused by the interconnect resistance can be avoided by using a low-resistance metal as the first electrode 3 and the second electrode 4.

According to the embodiment, similarly to the first embodiment, a display device having low optical loss and a high light utilization efficiency can be obtained.

Although the first electrode 3 and the second electrode 4 are provided on the liquid crystal dispersion layer 17 in the embodiment, similar effects also can be obtained by using a configuration in which the first electrode 3 and the second electrode 4 are provided on the first transparent substrate 121.

Third Embodiment

Figure 5:
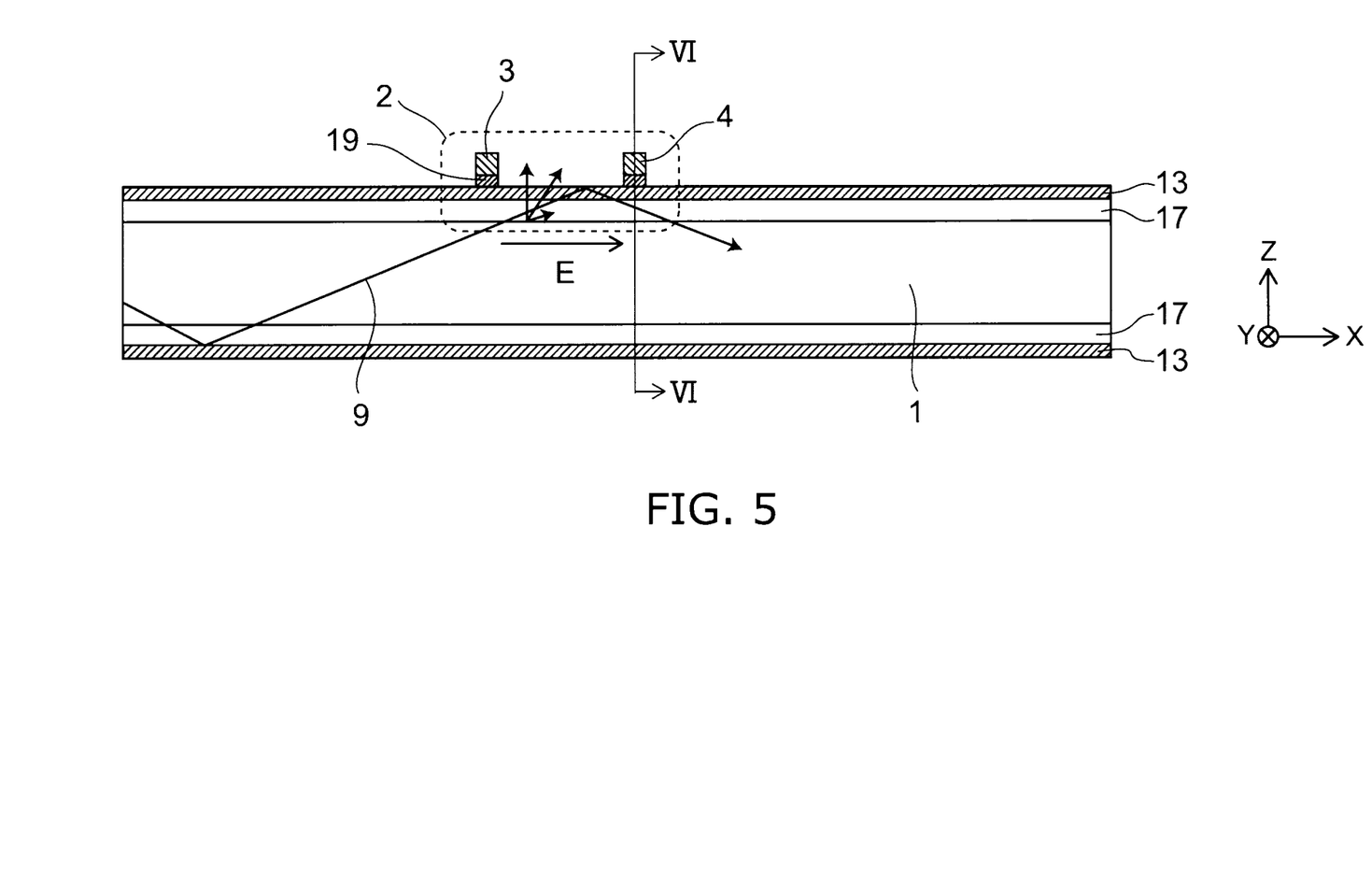
FIG. 5 is a cross-sectional view of a display device according to a third embodiment.
Figure 6:
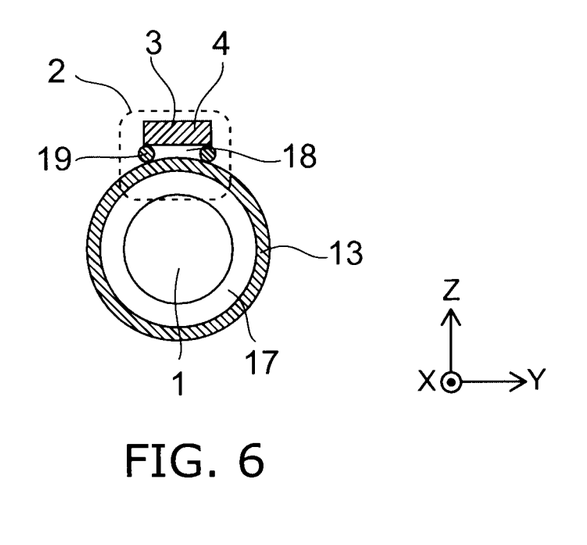
FIG. 6 is an enlarged view illustrating the cross section along line VI-VI of the display device of FIG. 5.

FIG. 5 illustrates an XZ cross section of a display device according to a third embodiment. FIG. 6 is an enlarged view illustrating the cross section along line VI-VI of FIG. 5. The third embodiment differs from the first embodiment in that the first transparent substrate and the second transparent substrate are not provided, and the light guide 1 and the liquid crystal dispersion layer 17 are formed as a single body.

In the embodiment, the light guide 1 has a circular columnar configuration.

The liquid crystal dispersion layer 17 is formed continuously on the surface of the light guide 1 to cover the surface of the light guide 1. A protective film 13 is formed on the liquid crystal dispersion layer 17 to cover the liquid crystal dispersion layer 17. The first electrode 3 and the second electrode 4 are disposed in juxtaposition in the X direction on the protective film 13. Major surfaces of the first electrode 3 and the second electrode 4 oppose the surface of the protective film 13. In the case where a material having a refractive index not less than the refractive index of the light guide 1 or the equivalent refractive index of the liquid crystal dispersion layer 17 is used as the protective film 13, a gap (an air layer) 18 is made between the protective film 13 and the first electrode 3 and between the protective film 13 and the second electrode 4 by using a pair of spacers 19. Although there is a risk that the light passing through the light guide 1 may leak out from the first electrode 3 and the second electrode 4 in the case where the first electrode 3 and the second electrode 4 contact the protective film 13, the leaking of the light is suppressed by making the gap 18 between the first electrode 3 and the light guide 1 and between the second electrode 4 and the light guide 1. The spacer 19 may be formed of, for example, a material having optical reflectance such as that of a metal film, a light-absorbing material, etc., such that the light does not leak out from the protective film 13 through the spacer 19.

Or, the first electrode 3 and the second electrode 4 may directly contact the protective film 13. In the case where the first electrode 3 and the second electrode 4 have optical reflectance such as that of a metal film, the light that reaches the protective film 13 interface is reflected by the metal film and again returns to the light guide 1. Although the light that reaches the first electrode 3 and the second electrode 4 is absorbed in the case where the first electrode 3 and the second electrode 4 are light-absorbing materials, the loss of the light due to the absorption by the first electrode 3 and the second electrode 4 can be kept low if the surface area of the first electrode 3 and the second electrode 4 is small.

A material such as polyfluoroacrylate (PFA, having a refractive index of 1.40), a fluorine-based material, etc., that has a refractive index lower than the refractive index of the light guide or the equivalent refractive index of the liquid crystal dispersion layer may be used as the protective film 13. In such a case, the light passing through the light guide 1 propagates while undergoing total internal reflections at the interface between the liquid crystal dispersion layer 17 and the protective film 13 because the protective film 13 functions as a clad layer. Therefore, the first electrode 3 and the second electrode 4 may be disposed in contact with the protective film 13.

Although not illustrated in FIGS. 4A and 4B, similarly to the second embodiment, the liquid crystal dispersion layer 17 includes the transparent member 7 and the liquid crystal droplets 6 which have an average diameter of not more than 100 nm; and the liquid crystal droplets include liquid crystal molecules having a positive dielectric anisotropy.

Similarly to the second example, the liquid crystal molecules of the liquid crystal droplets 6 have random orientations in the case where the voltage is not applied to the first electrode 3 and the second electrode 4. The light passing through the liquid crystal dispersion layer 17 is reflected by the second transparent substrate 122 and returns to the light guide 1. In the case where the voltage is applied to the first electrode 3 and the second electrode 4, the orientations of the liquid crystal molecules of the liquid crystal droplets 6 align in the X direction. Accordingly, of the light passing through the liquid crystal dispersion layer 17, the component polarizing in the X direction can be deflected in the Z direction.

Thus, the amount of the light extracted to the outside of the light guide 1 can be increased. Moreover, the light leakage can be prevented.

An example of such a display device is as follows. Namely, a mixture of a resin and the material of the liquid crystal droplets is coated with a thickness of 10 μm on the surface of the light guide. The liquid crystal dispersion layer is formed by curing the resin by irradiating ultraviolet rays onto the mixture. Polymethylmethacrylate (refractive index of 1.49) is used as the light guide. A fluorocarbon resin is used as the resin. A material having a small equivalent refractive index is used as the liquid crystal dispersion layer; and Fresnel reflections and total internal reflections are prevented from occurring at the interface between the light guide and the liquid crystal dispersion layer by the equivalent refractive index of the liquid crystal dispersion layer approaching the refractive index of the light guide. Accordingly, it is possible to further reduce the optical loss.

The average diameter of the liquid crystal droplets inside the liquid crystal dispersion layer is 50 nm. Further, a protective film is coated onto the liquid crystal dispersion layer surface with a thickness of 5 μm and cured. Polyfluoroacrylate (PFA, having a refractive index of 1.40) is used as the protective film. The protective film also functions as a clad layer of the optical fiber.

Then, a pair of spacers having a height of 5 μm is provided on the protective film. The first electrode and the second electrode are disposed in-plane 50 μm apart on the spacers. A voltage of 200 V is applied between the two electrodes. The liquid crystal dispersion layer proximal to the electrodes deflected the light inside the light guide by an electric field E; and the light inside the light guide is extracted.

In the embodiment, a roll-to-roll process can be applied and the manufacturing is easy because the liquid crystal dispersion layer and the protective film can be formed continuously on a light guide having a long optical fiber configuration.

Fourth Embodiment

Figure 7:
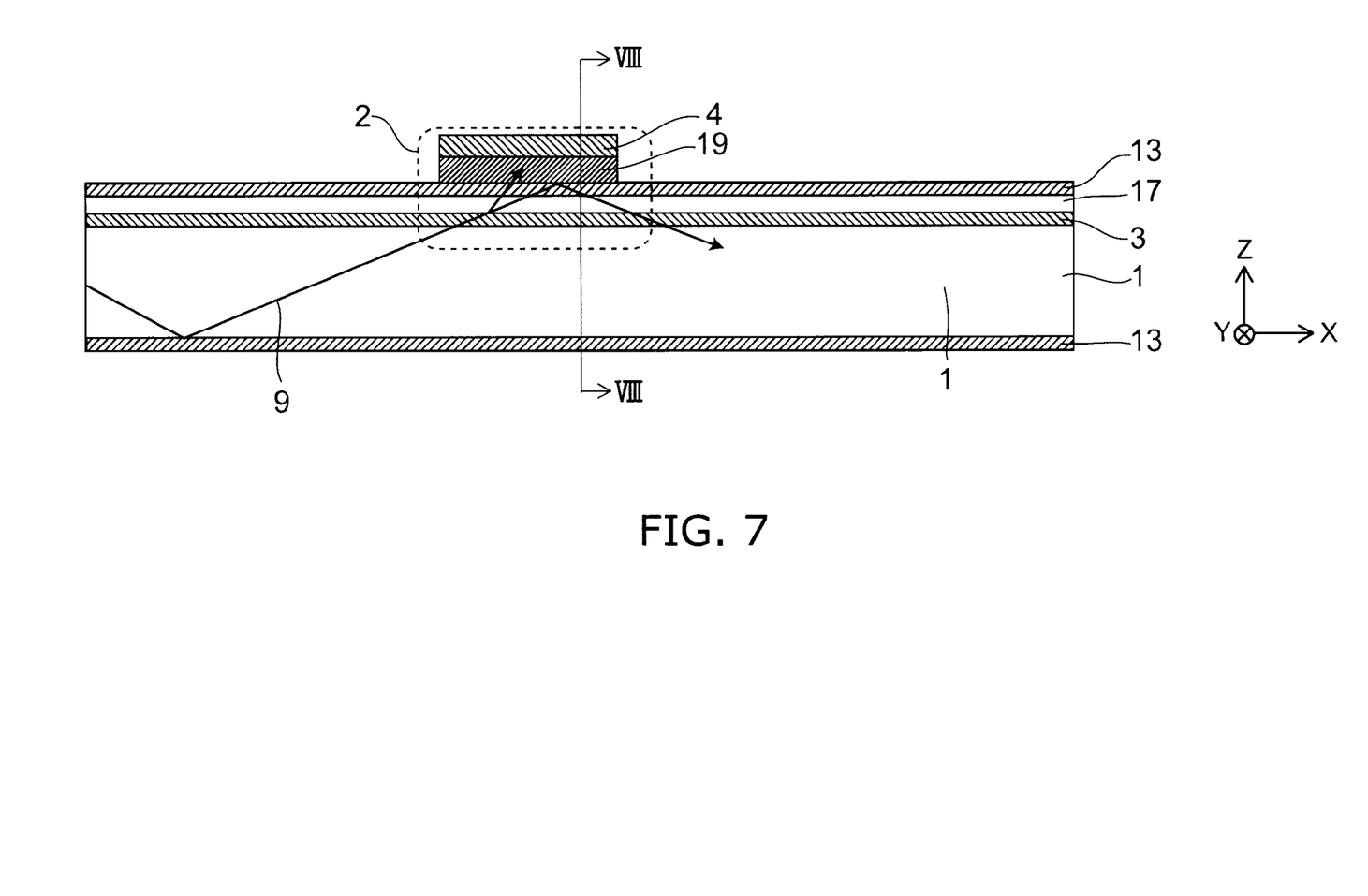
FIG. 7 is a cross-sectional view of a display device according to a fourth embodiment.
Figure 8:
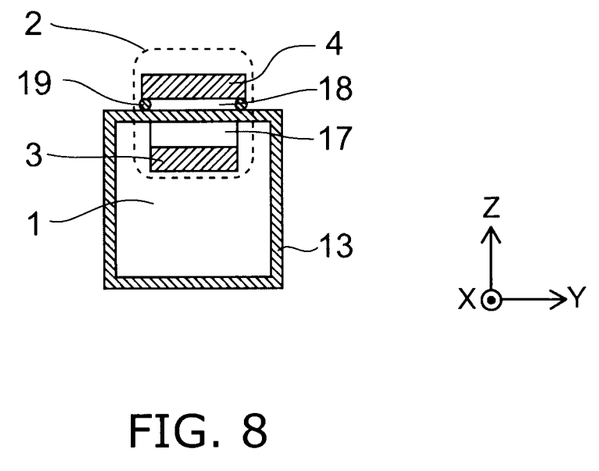
FIG. 8 is an enlarged view illustrating the cross section along line VIII-VIII of the display device of FIG. 7.

FIG. 7 is an XZ cross-sectional view of a display device according to a fourth embodiment. FIG. 8 is an enlarged view of the cross section along line VIII-VIII of FIG. 7. The fourth embodiment differs from the first embodiment in that the configurations and the dispositions of the first electrode 3, the liquid crystal dispersion layer 17, and the second electrode 4 are different from those of the first embodiment. Moreover, the first transparent substrate and the second transparent substrate are not provided.

In the embodiment, the light guide 1 has a quadrilateral columnar configuration.

The first electrode 3 extending in the X direction is formed on a portion of the surface of the light guide 1. The liquid crystal dispersion layer 17 extending in the X direction is formed on the first electrode 3. The protective film 13 is formed on the liquid crystal dispersion layer 17 to cover the liquid crystal dispersion layer 17. Although it is sufficient for the protective film 13 to cover at least the liquid crystal dispersion layer 17, in the embodiment, the protective film 13 covers the liquid crystal dispersion layer 17 and the light guide 1.

The second electrode 4 is disposed on a portion of the protective film 13 with the pair of spacers 19 interposed. The gap (the air layer) 18 is made between the protective film 13, the electrode 4, and the pair of spacers 19. Although not illustrated in FIG. 6, similarly to the embodiment described above, the liquid crystal dispersion layer 17 includes the transparent member 7 and liquid crystal droplets which have an average diameter of not more than 100 nm; and the liquid crystal molecules included in the liquid crystal droplets include a negative dielectric anisotropy.

Similarly to the first embodiment, in the case where the voltage is not applied to the first electrode 3 and the second electrode 4, the orientations of the liquid crystal molecules are random; and the light passing through the liquid crystal dispersion layer 17 is reflected by the second transparent substrate 122 and returns to the light guide 1. When the voltage is applied to the first electrode 3 and the second electrode 4, the liquid crystal molecules have random orientations in the XY plane. Accordingly, of the light passing through the liquid crystal dispersion layer 17, the component polarizing in the X direction and the component polarizing in the Y direction are deflected in the Z direction.

In the case where the protective film and the electrodes are in contact, there is a risk that the light inside the light guide 1 may leak out from the electrode portions even when the voltage is not applied to the electrodes due to the difference of the refractive indexes between the protective film and the electrodes. However, the light passing through the light guide can be prevented from leaking out from the electrode portions by providing the gap between the protective film and the electrodes.

Thus, the amount of the light extracted to the outside of the light guide 1 can be increased. Moreover, the light leakage can be prevented.

An example of a method for manufacturing the display device is as follows. Namely, the liquid crystal dispersion layer is formed by coating a mixture of the resin and the material of the liquid crystal droplets onto the first electrode 3 with a thickness of 10 μm, by irradiating ultraviolet rays, and by curing the resin. The average diameter of the liquid crystal droplets inside the liquid crystal dispersion layer is 50 nm. A protective film is coated onto the liquid crystal dispersion layer surface with a thickness of 5 μm and cured. Polymethylmethacrylate, which is the same material as that of the light guide 1, is used as the protective film. A material having a refractive index lower than the refractive index of the light guide or the equivalent refractive index of the liquid crystal dispersion layer may be used as the protective film. Other than polyfluoroacrylate, a fluorine-based material, etc., may be used as the protective film. In such a case, the protective film also functions as a clad layer of the optical fiber.

Then, the pair of spacers is provided on the protective film with a height of 5 μm. The second electrode is disposed in-plane 50 μm apart on the pair of spacers. A gap is made between the protective film, the second electrode, and the pair of spacers. A voltage of 200 V is applied between the two electrodes. The liquid crystal dispersion layer proximal to the electrodes deflected the light inside the light guide; and the light inside the light guide is extracted.

Although there is a risk that the light inside the light guide may undesirably leak out from the electrode portions and be extracted even in the non-applied voltage state due to the difference of the refractive indexes between the protective film and the electrodes in the case where the protective film and the electrodes are in contact, the light passing through the light guide can be prevented from leaking out from the electrode portions by providing the gap.

In the embodiment, similarly to the first embodiment, the optical loss of the display device can be reduced.

In the embodiment, a roll-to-roll process can be applied and the manufacturing is easy because the liquid crystal dispersion layer and the protective film can be formed continuously on a light guide having a long optical fiber configuration.

Hereinabove, exemplary embodiments of the invention are described with reference to specific examples. However, the embodiments of the invention are not limited to these specific examples.

Hereinabove, exemplary embodiments of the invention are described with reference to specific examples. However, the embodiments of the invention are not limited to these specific examples. One skilled in the art may similarly practice the invention by appropriately selecting specific configurations of components from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all display devices, practicable by an appropriate design modification by one skilled in the art based on the display devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
a light source;
a light guide configured to guide light emitted by the light source from one end side of the light guide opposing the light source toward one other end side of the light guide;
a light extraction unit provided on a surface of the light guide, the light extraction unit including a liquid crystal dispersion layer, a first electrode, and a second electrode, the liquid crystal dispersion layer including liquid crystal droplets having an average diameter of not more than 100 nm, the first electrode and the second electrode being configured to cause an electric field to occur in the liquid crystal dispersion layer; and
a drive circuit configured to apply a voltage between the first electrode and the second electrode,
liquid crystal molecules included in the liquid crystal droplets being configured to have an orientation parallel to the surface of the light guide in the electric field, and
the liquid crystal molecules being configured to have a random orientation in a state without the electric field.

2. The device according to claim 1, wherein
the liquid crystal droplets include liquid crystal molecules having a negative dielectric anisotropy, and
the first electrode is provided between the light guide and the liquid crystal dispersion layer, the second electrode is provided on the liquid crystal dispersion layer, and the electric field is caused to occur in a direction perpendicular to the surface of the light guide.

3. The device according to claim 1, wherein:
the liquid crystal droplets include liquid crystal molecules having a positive dielectric anisotropy; and
the first electrode and the second electrode are juxtaposed parallel to the surface of the light guide and are configured to cause the electric field to occur in a direction parallel to the surface of the light guide.

4. The device according to claim 1, wherein a plurality of the light guides are disposed parallel to each other, and the light extraction units are multiply provided for each of the light guides.

5. A display device, comprising:
a light source;
a light guide configured to guide light emitted by the light source from one end side of the light guide opposing the light source toward one other end side of the light guide;
a light extraction unit provided on a surface of the light guide, the light extraction unit including a liquid crystal dispersion layer, a first electrode, and a second electrode, the liquid crystal dispersion layer including liquid crystal droplets having an average diameter of not more than 100 nm, the first electrode and the second electrode being configured to cause an electric field to occur in the liquid crystal dispersion layer; and
a drive circuit configured to apply a voltage between the first electrode and the second electrode,
liquid crystal molecules included in the liquid crystal droplets being configured to have an orientation parallel to the surface of the light guide in the electric field,
wherein
the liquid crystal droplets include liquid crystal molecules having a positive dielectric anisotropy,
the first electrode and the second electrode are juxtaposed parallel to the surface of the light guide and are configured to cause the electric field to occur in a direction parallel to the surface of the light guide, and
wherein the light extraction unit includes a first substrate provided on the light guide, the liquid crystal dispersion layer provided on the first substrate, a second substrate provided on the liquid crystal dispersion layer, and the first electrode and the second electrode provided between the liquid crystal dispersion layer and the second substrate along an outer edge of the second substrate.

6. The device according to claim 5, wherein a plurality of the light guides are disposed parallel to each other, and the light extraction units are multiply provided for each of the light guides.

7. A display device, comprising:
a light source;
a light guide configured to guide light emitted by the light source from one end side of the light guide opposing the light source toward one other end side of the light guide;
a light extraction unit provided on a surface of the light guide, the light extraction unit including a liquid crystal dispersion layer, a first electrode, and a second electrode, the liquid crystal dispersion layer including liquid crystal droplets having an average diameter of not more than 100 nm, the first electrode and the second electrode being configured to cause an electric field to occur in the liquid crystal dispersion layer; and
a drive circuit configured to apply a voltage between the first electrode and the second electrode,
liquid crystal molecules included in the liquid crystal droplets being configured to have an orientation parallel to the surface of the light guide in the electric field, wherein the liquid crystal droplets include liquid crystal molecules having a negative dielectric anisotropy, the first electrode is provided between the light guide and the liquid crystal dispersion layer, the second electrode is provided on the liquid crystal dispersion layer, and the electric field is caused to occur in a direction perpendicular to the surface of the light guide, and wherein an air layer is provided between the liquid crystal dispersion layer and the second electrode.

8. The device according to claim 7, wherein the light extraction unit includes the first electrode provided on the light guide, the liquid crystal dispersion layer provided on the first electrode, a protective film provided on the liquid crystal dispersion layer, and the second electrode provided on the protective film with the air layer interposed.

9. The device according to claim 7, wherein the light extraction unit includes the liquid crystal dispersion layer provided on the light guide, the protective film provided on the liquid crystal dispersion layer, and the first electrode and the second electrode provided on the protective film with the air layer interposed.

10. The device according to claim 7, wherein a plurality of the light guides are disposed parallel to each other, and the light extraction units are multiply provided for each of the light guides.

11. A display device, comprising:

a light source;

a light guide configured to guide light emitted by the light source from one end side of the light guide opposing the light source toward one other end side of the light guide;

a light extraction unit provided on a surface of the light guide, the light extraction unit including a liquid crystal dispersion layer, a first electrode, and a second electrode, the liquid crystal dispersion layer including liquid crystal droplets having an average diameter of not more than 100 nm, the first electrode and the second electrode being configured to cause an electric field to occur in the liquid crystal dispersion layer; and a drive circuit configured to apply a voltage between the first electrode and the second electrode, liquid crystal molecules included in the liquid crystal droplets being configured to have an orientation parallel to the surface of the light guide in the electric field, wherein the liquid crystal droplets include liquid crystal molecules having a positive dielectric anisotropy, the first electrode and the second electrode are juxtaposed parallel to the surface of the light guide and are configured to cause the electric field to occur in a direction parallel to the surface of the light guide, and wherein an air layer is provided between the liquid crystal dispersion layer and the first electrode and between the liquid crystal dispersion layer and the second electrode.

12. The device according to claim 11, wherein a plurality of the light guides are disposed parallel to each other, and the light extraction units are multiply provided for each of the light guides.

* * * * *